Sept. 19, 1933.  F. M. KERN  1,927,039
HONING TOOL
Filed March 9, 1931  2 Sheets-Sheet 1
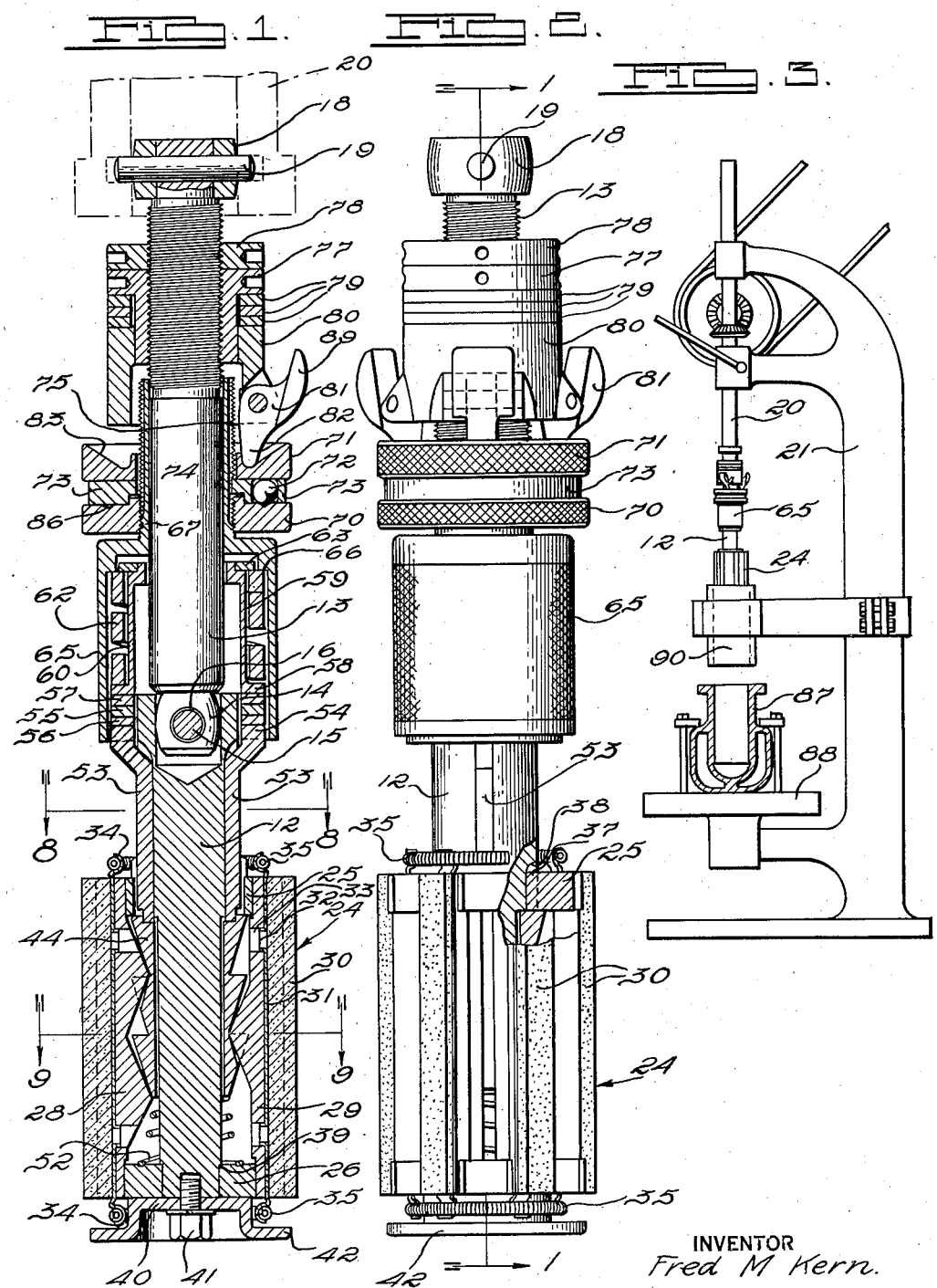
INVENTOR
Fred M Kern.
BY
Harness, Dickey, Pierce & Hann
ATTORNEYS.

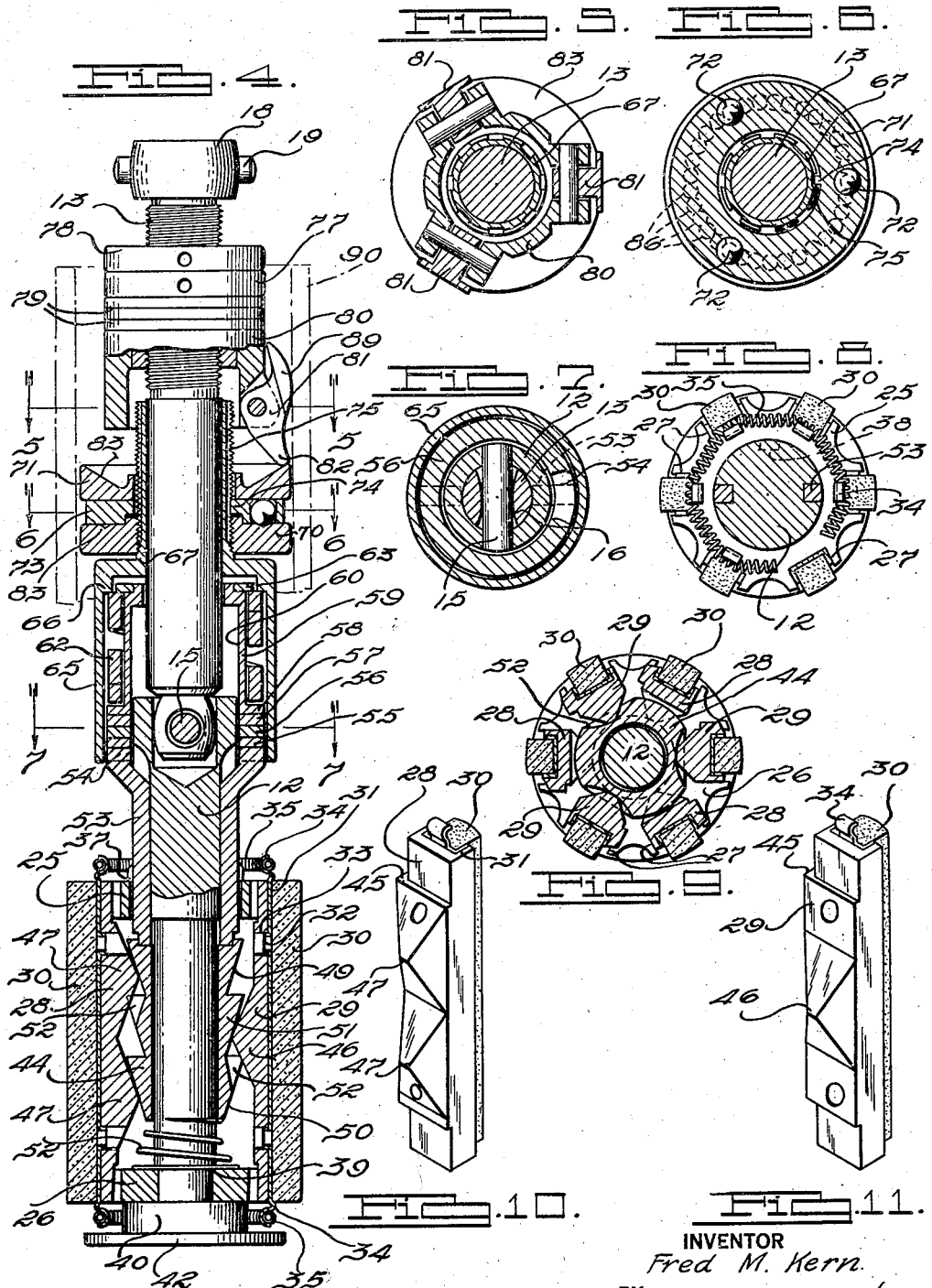

Patented Sept. 19, 1933

1,927,039

UNITED STATES PATENT OFFICE 1,927,039

HONING TOOL

Fred M. Kern, Detroit, Mich., assignor to Micromatic Hone Corporation, a corporation of Michigan Application March 9, 1931. Serial No. 521,089

20 Claims. (Cl. 51—184.3)

My invention relates to cylinder honing tools and particularly to improved methods of controlling the expansion and adjustment of the honing elements thereof.

The principal objects of my invention are: to provide a tool in which the abrading body is freely movable radially of the supporting spindle of the tool for adjustment relative to the surface of the cylinder bore; to provide a spindle for the tool having a universal joint therein; and to provide means for transmitting pressure through the universal joint, for controlling the expansion of the abrading elements without restricting or interfering with the movements of the joint.

Further objects are: to provide a freely adjustable ratchet member for regulating the position of the expansible elements which effects closely spaced indexing of the elements relative to a cylinder wall; to provide means for applying a pressure for expanding the elements a predetermined amount and for preventing any pressure being exerted thereafter; and to support the abrading elements in such manner as to effect a high polish and minute accuracy.

Numerous other objects and features of novelty of my invention will be either specifically pointed out or will become apparent when referring, for a better understanding of my invention, to the following description in conjunction with the accompanying drawings, wherein:

Figure 1 is a view, in section, of a honing tool embodying features of my invention, taken on the line 1—1 of Fig. 2, with the honing elements in retracted position, Fig. 2 is a broken view, in elevation, of the tool shown in section in Fig. 1, Fig. 3 is a reduced view, in side elevation, of a machine provided with the tool illustrated in Figs. 1 and 2, Fig. 4 is a view, similar to that of Fig. 1 with the honing elements in expanded position, Fig. 5 is a sectional view of the structure shown in Fig. 4 taken along the line 5—5 thereof, Fig. 6 is a sectional view of the structure shown in Fig. 4 taken along the line 6—6 thereof, Fig. 7 is a sectional view of the structure shown in Fig. 4 taken along the line 7—7 thereof, Fig. 8 is a sectional view of the structure shown in Fig. 1 taken along the line 8—8 thereof, Fig. 9 is a sectional view of the structure shown in Fig. 1 taken along the line 9—9 thereof, Fig. 10 is a perspective view of an abrading member and a supporting block, which is mountable in my tool for parallel movement outwardly, and Fig. 11 is a perspective view of an abrading member and a supporting block, which is mountable in my tool for adjustable movement outwardly.

My invention comprises a universally jointed supporting member which includes a body spindle 12 and a head spindle 13. The upper end of the body spindle 12 is recessed to receive the spherically formed lower end 14 of the spindle 13, and connection is made by the cross pin 15 which extends through the spindles 12 and 13, as best shown in Fig. 7. A hole 16, through the head spindle 13, is illustrated as being tapered outwardly from the center to permit the pin to be tilted in the plane of its axis. A collar 18, having arcuate sides, is supported on the reduced upper end of the head spindle 13 by a cross pin 19 which extends either side thereof at right angles to the lower pin 15. The collar 18 and the pin 19 serves to releasably secure the tool to a drive shaft 20 of a machine 21, shown in Fig. 3, in such manner as to provide a flexible driving connection therewith.

A pair of spiders 25 and 26 are mounted in spaced, fixed relation on the lower end of the body spindle 12 and are provided with peripheral slots 27 in which blocks or holders 28 and 29 register for sliding movement therein. Abrading members or stones 30 are set in metal members 31, the backs of the holders being provided with projections 32 for releasably engaging suitable recesses or holes 33 formed in the holders 28 and 29. The members 31 are provided with projecting hooks 34 at both ends for receiving garter springs 35 which serve to retain the abrading members 30 and the holders 28 and 29 within the slots 27 provided in the spiders.

The upper spider 25 is pressed against a shoulder 37, formed on the circumference of the body spindle 12, and is secured against rotation thereon by a key 38. The lower spider 26 is likewise seated against a shoulder 39 on the spindle 12, and is retained on the spindle along with a plate 40, by a cap screw 41, shown more clearly in Fig. 1. A key (not shown) is employed for preventing the rotation of the spider 26 relative to the spindle. The plate 40 is cup-shaped and has an outwardly projecting flange 42 formed thereon for protecting the abrading elements.

For expanding or positioning the abrading member 30 outwardly of the spindle I provide an actuating wedge or cone member 44, which is slidably mounted on the body spindle 12, between the spiders 25 and 26, within the confines of the holders 28 and 29. The actuating member 44 is of substantially tubular shaped having a plurality of conical surfaces provided on its outer circumference which will be described more fully hereinafter.

To provide a tool for effecting a rapid and extremely accurate cutting and also for obtaining a high polish, I employ means on the holders 28, which cooperate with the actuating member 44 in such manner as to be retained in parallel relation to the spindle, in contradistinction to the movement of holders 29 which are pivotally supported in relation to the actuating member. The holders 28 and 29 are alternately disposed about the spindle 12 and are biased outwardly by an equal pressure. Both ends of the holders 28 and 29 are provided with shoulders 45 for engaging the inner surface of the spiders 25 and 26 to prevent longitudinal shifting of the holders.

From Figs. 8 and 9 it will be observed that six abrading members 30 are employed on my tool, three of the holders 29 therefor, as shown in Fig. 9 are constructed with a single centrally disposed sloping projection 46, the remaining three holders 28 which are in alternate relation to the holders 29, are provided with two spaced sloping projections 47. The holders 29 may thus rock longitudinally while the holders 28 are retained at all times in parallel relation to the spindle 21.

The actuating member 44 has three similar sloping conically shaped portions formed in its outer circumference, the upper and lower conical portions 49 and 50 engages the projections 47 on the holders 28 and the intermediate conical portion 51 engages the projections 47 on the holders 29. Suitable recesses 52 are formed in the two lower conical portions 50 and 51 to accommodate the sloping projections 46 and 47, respectively of the adjacent holders as shown in Figs. 4 and 9.

The surfaces of the holders and the conical portions are sloped in such manner that the ends of the projections engage the conical surfaces only at a point. The slopes are such that the movement therebetween is non-reversible, that is to say, that comparatively little pressure is required to move the actuating member 44 downwardly to expand the abrading members 30, but pressure inwardly on the members is insufficient to move the member 44 upwardly. Downward movement of the member 44 simultaneously moves all of the abrasive elements outwardly, equal distances from the axis of the spindle. The alternate abrading members are supported so as to tilt longitudinally to conform to a surface to be honed, while the adjacent abrading members are retained in parallel relation to the spindle and to each other. The tiltable abrading members effect rapid cutting while the parallel members maintain a true cylinder and effect a high polish. The employment of the two types of abrading members effect a combination of advantages never heretofore obtained in a tool provided with a single support for the members.

The actuating member 44 is biased upwardly against the member 25 by means of a relatively weak spring 52 which is compressed between the lower end of the member 44 and the spider 26. The upper portion of the body spindle 12 is grooved at opposite sides to receive and guide, fingers 53 which extend through the spider 25 and engage the upper end of the member 44. At their upper ends the fingers 53 are integral with an annular portion 54 which encompasses the upper portion of the spindle 12 and is freely movable relative thereto.

On the top surface of the annular portion 54 are provided two bronze thrust washers 55 and 56 and a steel washer 57 for reducing the rotational friction therebetween. Engaging the upper washer 57 is a flange 58 which is formed on the lower end of a spring cage 59. A heavy helical spring 62 is mounted in the cage 59, under initial compression, between the flange 58 and a washer 63 which is retained in fixed position on the cylindrical portion 60 of the cage. An enclosing housing 65 extends over the spring 62 and is spaced from the washers 55 to 57 inclusive, to provide a clearance therebetween which permits universal movement of the body spindle 12. A shoulder 66 on the inner surface of the housing 65 engages the top portion of the spring 62 and when moved downwardly relative to the cage 50, compresses the spring against the flange 58.

The housing 65 is provided with a sleeve 67 on its upper end which extends over the head spindle 13 in such manner as to be freely movable thereon. The outer surface of the sleeve 67 is provided with a splined thread upon which an adjusting collar 70 is screwed having a plurality of recesses 86 on its upper surface. A plurality of ball bearings 72, shown more clearly in Fig. 6 to be three in number, although it is to be understood that any number of balls may be employed, are retained in fixed relative position to each other on the collar 70 by means of a cage ring 73. The cage ring 73 is retained in fixed position relative to the sleeve 67 by means of a projection 74 which engage the spline provided in the threaded portion of the sleeve 67. A thrust collar 71 is mounted on the top of the cage ring 73 in longitudinally slidable relation to the threaded portion of the sleeve 67.

The upper threaded end of the head spindle 13 is provided with a pair of nuts 77 and 78 which are relatively movable for providing a locking engagement for longitudinally positioning a cam carrying collar 80 which is supported thereon. Between the flange on the nut 77 and the collar 80, a plurality of bearings 79 are provided for reducing the rotational friction between the members when adjustment is made.

Referring more particularly to Fig. 3, it may be noted that the threads on the nut 77 extend a considerable distance below the outer surface of the nut for the purpose of providing a surface for receiving the inner surface of the collar 80. When an adjustment of the cam carrying collar 80 is to be made the upper nut 78 is loosened and the lower nut 77 is turned to effect its adjustment and therefore, that of the collar 80 relative to the head spindle 13, after which the nut 78 is tightened against the nut 77 to retain the latter in locked position on the spindle.

A plurality of brackets are provided on the lower portion of the collar 80, in which a plurality of cams 81 are supported for pivotal movement. Projections 82 on the cams 81 engage camming surfaces 83 provided on the upper surface of the collar 71 which are sloped in such manner that an inward movement of the upper end of the cams 81 causes the projections 82 thereof to move outwardly along the surfaces 83 and force the collar 71 downwardly for applying a pressure to the spring 62. The engagement of the projections 82 with the cam surfaces 83 is such that the projection never reaches a central or toggle position and it is necessary to retain the cams in camming position in a manner which will be explained hereinafter.

When an adjustment is to be made the cams are released and the collar 70 is rotated relative to the threads on the shank 67 an amount which is indicated by the passage of a ball from one recess 86 to another. The bias between the collars 70 and 71 effected by the spring 62 and the cams 81 cause the ball to snap from one recess to another in the same manner as a ratchet passes over a notch and an indication is made to the operator by means of which the indexing of the tool is accomplished.

Referring again to Fig. 3 a cylinder 87 is illustrated as being mounted on a work table 88 for the purpose of having the inner surface of the cylinder honed by my honing tool, herein described and illustrated. A sleeve 90 is mounted adjacent to the cylinder 87, by a suitable supporting means, for the purpose of engaging shoulders 89 on the cams 81. The engagement between the cams and the sleeve 90 is illustrated more clearly in Fig. 4 wherein the sleeve 90 is shown in dot and dash line as engaging the shoulders 89 of the cams and retaining the projections 82 thereof in outwardly camming position.

The operation of my tool will now be described in detail. The tool is supported for universal movement on the shaft 20 of the machine 21, as shown more clearly in Fig. 3, and is rotated therewith as a unit. The shaft 20 is lowered until the abrading members 30 are received within the inner surface of the cylinder 87. Further downward movement of the tool causes the cams 81 to be engaged by the sleeve 90 at the ends 89 thereof to cause the housing 65 to be moved downwardly relatively to the spring cage 59 to effect a pressure between the cage and the housing which is transmitted through the fingers 53 to the actuating member 44 for expanding the abrading members 30 radially of the body spindle 12.

In this position the collar 70 is screwed upwardly on the sleeve 75 to cause the downward movement of the housing 65, relative to the spindle, to force the abrading elements 30 outwardly in firm engagement with the cylinder wall. The tool is then withdrawn from the cylinder a distance sufficient to collapse the cams 81 and the collar 70 is then adjusted a number of notches in proportion to the amount of material to be machined from the cylinder.

The upward and downward movement of the tool is limited to permit only approximately one third of the abrading members to extend outside of either end of the cylinder and, when a greater movement of the tool occurs the cams 81 thereof pass outwardly of the sleeve 90 to thereby collapse the stones and keep them from tilting relatively to the inner surface of the cylinder which would otherwise deform the cylindrical wall and the stones. The pressure will be continuously applied to the abrading members 30 to effect their radial movement until the washers 63 provided on the upper end of the cage 59 engages the top portion of the spring 62 which thereby eliminates the bias from between the cage and the housing 65.

In this manner the cylinder is machined a predetermined amount with one setting and if the cylinder is not then of the desired diameter the tool may again be removed from the cylinder a predetermined distance to release the cams in order to effect a second adjustment of the indexing assembly. The collar is turned a predetermined number of notches to cause the spring to be compressed a desirable distance which will be equal to the amount of machining required to obtain the desired diameter of the cylinder. The insertion of the tool into the cylinder will cause the cams to be again actuated to apply a bias to the actuating member 44 to cause the honing elements 80 to be moved outwardly until the washer 63 of the spring cage again engages the top of the spring and eliminates the bias from between the spring cage and the housing 65. Once the honing tool has been set, in this manner to machine a cylinder to a proper diameter, no further setting is required to machine similar cylinders to the same diameters except for a periodic, slight adjustment because of the wearing of the stones.

During the operation of my tool, the clearance between the housing and the annular portion 54 permits a universal movement of the spindle 12 relative to the head spindle 13 which movement is expedited by the employment of the bearings 55, 56 and 57 between the spring cage and the annular portion. The universal joint, employed between the spindle portions 12 and 13 and between the head spindle 13 and the shaft 20, provides a complete flexibility to the abrading members 30 to permit them to center themselves within the cylinders.

While I have shown the actuating fingers 53 as being guided in the slots provided in the body spindle 12, it is to be understood that, when a tool is employed for large diameter cylinders, the actuating fingers may be spaced from the spindle and be retained in predetermined position by the slots in the spider 25.

It will thus be seen that I have provided a honing tool with an actuating member for the honing elements, which retain a portion thereof in parallel relation to the axis of the tool, the portion of the elements therebetween being supported for pivotal movement radially of the tool. A universal joint is provided in the body portion of the spindle, below the biasing element, in such manner that the honing end of the tool is freely swingable on the head portion thereof. To provide further flexibility to the tool, its upper end is provided with an engaging end for receiving an actuating mechanism in such manner as to effect a universal connection therewith. In this manner there is no possibility of cocking the honing element in the cylinder which is, therefore, free to follow the bore of the cylinder which is provided normal to the supporting face.

By providing a spring cage which retains the spring in initial compressed condition, only a predetermined amount of movement is effected between the spring cage and the housing, which is transferred to the honing elements to move them radially outward from the tool an amount which is proportional to the amount of surface to be machined from within the cylinder. An indexing collar is provided with a plurality of notches across which a plurality of balls are biased to provide a snap action which indicates to an operator the amount of outward movement which will be applied to the honing element.

While I have described and illustrated but a single embodiment of my invention it will be apparent to anyone skilled in the art that many changes, additions, omissions and substitutions may be made therein without departing from the spirit and scope of my invention as set forth in the accompanying claims.

I claim as my invention:
1. A honing tool having outwardly movable abrading members, means for supporting said members, a spring for expanding the members, relatively non-adjustable means for retaining said spring initially under compression and for limiting its expansion after compression, and adjustable means for compressing the spring a predetermined amount to expand said members.

2. A honing tool having an expansible abrading body, a spring for expanding the body, means for holding the spring under initial compression in a position of inoperativeness, and adjustable means for compressing the spring a predetermined amount beyond the initial compression for expanding said body.

3. A honing tool having an expansible abrading body, a spring for expanding the body, a cage for engaging both sides of the spring for holding it under initial compression, and adjustable means for compressing the spring within the cage a predetermined amount.

4. A honing tool having an expansible abrading body, a spring, a cage engaging both sides of the spring for retaining it under initial compression, means for interconnecting said cage with the body and adjustable means for biasing the spring a predetermined amount beyond its initial compression for moving said means and effecting the predetermined expansion of said abrading body.

5. A honing tool in combination, a spindle, abrading members, means for supporting said abrading members for outward movement on the spindle, an expander slidably mounted on the spindle for moving the members outwardly, a spring associated with the expander, a cage retaining the spring under an initial compression and a sleeve adjustable on the spindle for compressing the spring beyond its initial compression which biases the expander to effect the outward movement of the abrading members.

6. In a cylinder honing tool, an expansible abrading body comprising a plurality of outwardly movable abrading members, means for supporting said members, a portion of the members being at all times supported parallel to the axis of the body, another portion of said members being rockable relative to said body, and means for simultaneously moving all of the members outwardly relative to the axis of said body.

7. In a cylinder honing tool, an abrading body comprising tiltably supported members in combination with members retained for movement in parallel relation to the axis of the tool, means for supporting said members, and a single means for moving all of the members outwardly.

8. A cylinder honing tool including in combination, a cylindrical body having peripherally arranged abrading members supported for rocking movement in combination with abrading members retained for movement in parallel relation to the axis of said tool, means for supporting said member relative to said body, and means for simultaneously adjusting all of the members relative to the axis of said body.

9. In a cylinder honing tool, abrading members supported to tilt longitudinally of the tool in alternating arrangement with members retained parallel to the axis of the tool, means for supporting said members, and means for moving the members outwardly relative to said axis.

10. In a cylinder honing tool, a plurality of longitudinally tiltable abrading members alternating with members retained in parallel relation to the tool axis, means for supporting said members, and means for simultaneously biasing all of said members outwardly relative to the axis of said tool with a uniform pressure.

11. In a cylinder honing tool in combination, an abrading body having longitudinally disposed abrading members mounted to move outwardly thereof, a member slidably mounted relative to the body having a surface in angular cooperative relation with some of the abrading members upon which the members can tilt and having surfaces in angular cooperative relation to other abrading members for retaining the members in parallel relation and means for positioning the movable member to expand the abrading body.

12. In a cylinder honing tool, an abrading body, holders for abrading elements mounted in the periphery of the body for outward movement relative thereto, a cone member axially slidable in the body, some of the holders engaging the cone member for pivotal movement, other holders being supported for outward movement while retained in parallel relation to the axis of the tool and means for moving the cone member to expand the body.

13. In a cylinder honing tool including in combination a body portion having outwardly movable abrading holders, a member having three conical surfaces axially movable relative to the body portion, some of the holders being in pivotal relation with one of the conical surfaces, others of the holders engaging two of the conical surfaces and means for moving the member to simultaneously project all the holders outwardly from the body portion.

14. In a cylinder honing tool, a spindle, an expansible abrading body fixedly mounted on the spindle, a wedging means slidably mounted on the spindle for expanding the body, a spring for biasing said wedging means, a sleeve slidably mounted on the spindle for compressing said spring, an adjusting collar threaded on the sleeve, for effecting the degree of movement thereof, the said collar being provided with a plurality of indentations and ball bearings in fixed relation with the sleeve and registering with said indentations for indexing the amount of adjustment.

15. In a cylinder honing tool, a spindle having an expansible body mounted thereon, a spring for applying a bias for expanding the body, a sleeve slidably mounted on the spindle and bearing on the spring, a member mounted on said spindle, above said sleeve, a collar adjustably mounted on said sleeve and balls interposed between the collar and the member held from rotating with the collar in which a circle of indentations are provided for engaging the balls.

16. In a cylinder honing tool, a spindle having an expansible abrading body mounted thereon, a sleeve slidably mounted on the spindle for expanding the body, an adjustable collar threaded on the sleeve for regulating the degree of expansion, balls engageable by indentations provided in said collar and a retainer for the balls slidably keyed on the sleeve.

17. In a cylinder honing tool, a spindle having an expansible abrading body mounted thereon, a sleeve slidably mounted on the spindle for expanding the body, an adjustable collar threaded on the sleeve, having a plurality of indentations therein, balls engaged by the indentations on said collars and means for retaining the balls against rotation relative to the sleeve.

18. In a cylinder honing tool, a spindle having an expansible abrading body mounted thereon, means slidably mounted on the spindle for expanding the body, a spring bearing against said slidable means, a sleeve slidably mounted on the spindle for compressing the spring, an adjustable collar threaded on the sleeve, a thrust collar slidably mounted on the sleeve, balls interposed between said collars and held from revolving relative to the sleeve, at least one of said collars having a circle of evenly spaced indentations for engagement of the balls.

19. In a cylinder hone, a spindle, an expansible abrading body mounted on the lower portion of the spindle, a universal joint provided medially of the spindle, adjustable means slidably mounted on the upper portion of the spindle, camming means slidably mounted on the lower portion of the spindle, a compression spring interposed between the adjustable and camming means, and means associated with said spring for reducing the resistance it offers to the movement of said joint.

20. In a cylinder honing tool, abrading members supported to tilt longitudinally of the tool in alternating arrangement with members retained parallel to the axis of the tool, means for supporting said members, and means for moving at least some of said members outwardly relative to said axis.

FRED M. KERN.